United States Patent [19]
Wood et al.

[11] Patent Number: 5,485,959
[45] Date of Patent: Jan. 23, 1996

[54] AXISYMMETRIC VECTORING EXHAUST NOZZLE THERMAL SHIELD

[75] Inventors: Jonathan M. Wood; Thomas A. Hauer, both of West Chester; William C. Lippmeier, Cincinnati, all of Ohio

[73] Assignee: General Electric Company, Cincinnati, Ohio

[21] Appl. No.: 72,678

[22] Filed: Jun. 7, 1993

Related U.S. Application Data

[63] Continuation of Ser. No. 700,979, May 16, 1991, abandoned.

[51] Int. Cl.⁶ .................................................. B64C 15/06
[52] U.S. Cl. ............................... 239/265.41; 239/265.19; 239/265.35; 239/265.39; 60/228; 60/230
[58] Field of Search .......................... 239/127.1, 127.3, 239/265.41, 265.39, 265.19, 265.33, 265.35, 265.37; 60/227, 228, 230, 232, 226.1, 271

[56] References Cited

U.S. PATENT DOCUMENTS

| | | | |
|---|---|---|---|
| 3,612,400 | 10/1971 | Johnson et al. | 239/265.19 |
| 3,972,475 | 8/1976 | Nelson et al. | 239/127.3 |
| 4,128,208 | 12/1978 | Ryan et al. | 239/265.39 |
| 4,245,787 | 1/1981 | Freid | 239/265.41 |
| 4,440,346 | 4/1984 | Wiley | 239/265.39 |
| 4,502,636 | 3/1985 | Nightingale et al. | 239/265.17 |
| 4,544,098 | 10/1985 | Warburton | 239/127.3 |
| 4,621,769 | 11/1986 | Szuminski | 239/265.39 |
| 4,643,356 | 2/1987 | Holler et al. | 239/127.3 |
| 4,800,718 | 1/1989 | Zimmerman | 239/127.3 |
| 4,884,748 | 12/1989 | Ward et al. | 239/265.37 |
| 4,994,660 | 2/1991 | Hauer | 239/60 |
| 5,000,386 | 3/1991 | Lybarger | 239/265.39 |
| 5,011,080 | 4/1991 | Barcza et al. | 239/265.39 |
| 5,076,496 | 12/1991 | Lippmeier | 239/265.41 |
| 5,082,182 | 1/1992 | Bruchez, Jr. et al. | 239/265.41 |

OTHER PUBLICATIONS

"Aircraft Gas Turbine Engine Technology"—Professor Irwin E. Treager Chapters 8 and 21, Exhaust Systems and General Electric J79.

Diagramatic Cross Section of J79-17 engine nozzle and 5 photographs showing secondary forward and aft cooling air slots on secondary flap.

*Primary Examiner*—Andres Kashnikow
*Assistant Examiner*—Christopher G. Trainor
*Attorney, Agent, or Firm*—Andrew C. Hess; David L. Narciso

[57] ABSTRACT

A thrust vectoring axisymmetric vectoring exhaust nozzle having universally pivoting divergent flaps is provided with a surrounding thermal shield of overlapping outer flaps and seals generally disposed in an aftwards converging conical arrangement and having a means for changing its shape from axisymmetrical to asymmetrical. Additional thermal and cooling protection is provided by a series of ejector slots located on the divergent universally pivotal flaps and adjacent interflap seals of the nozzle to both cool and thermally shield the flaps and seals.

20 Claims, 5 Drawing Sheets

AXISYMMETRIC VECTORING EXHAUST NOZZLE THERMAL SHIELD

This application is a continuation of application Ser. No. 07/700,979, filed May 16, 1991, now abandoned.

BACKGROUND OF THE INVENTION

1. Field of the Invention

This invention relates generally to thermal shielding for aircraft gas turbine engine vectorable nozzles and, more particularly, to using outer flaps and shields and flap mounted ejectors for shielding and cooling axisymmetric vectorable exhaust nozzles.

2. Discussion of the Background Art

Vectorable nozzles have been developed for military aircraft gas turbine engines to increase the maneuverability of the aircraft both for air to air combat missions and complicated ground attack missions. Vectorable nozzles generally employ flaps to turn or vector the exhaust flow and thrust of the gas turbine engine powering the aircraft. Two dimensional nozzles have been devised which employ relatively flat flaps to direct the pitch or yaw direction of the engine's thrust. Hauer in U.S. Pat. No. 4,994,660, herein incorporated by reference, discloses an Axisymmetric Vectoring Nozzle (AVEN® nozzle) that provides a means for vectoring the thrust of an axisymmetric convergent/divergent nozzle by universally pivoting the divergent flaps of the nozzle in an asymmetric fashion or in other words pivoting the divergent flaps in radial and tangential directions with respect to the unvectored nozzle centerline.

Vectoring nozzles, and in particular axisymmetric vectoring nozzles of the type disclosed in the Hauer reference, generally employ directionally controllable flaps to vector the aircraft engine's thrust by turning the hot exhaust flow. The hot nozzle flow is contained by a flap and seal arrangement wherein the divergent flaps and seals are pivotally connected to the nozzle throat in a manner permitting 2 degree of freedom (2 DOF) pivotal movement and axial translation of the exhaust nozzle exit. To this end, twistable divergent seals were developed as disclosed in U.S. patent application Ser. 07/475,465 to William C. Lippmeier, entitled "Exhaust Nozzle Flap Seal" assigned to the same assignee, and incorporated herein by reference. A twistable seal was developed to conform to the skewed flap edges of adjacent vectored nozzle divergent flaps.

Hot nozzles emit infrared radiation which is highly undesirable for military combat aircraft. Infrared radiation from gas turbine engines is conventionally suppressed by shielding and cooling the hot metal structures of the engine. The use of outer flaps and seals around the divergent section of variable nozzles is demonstrated in U.S. Pat. No. 4,128,208 by Ryan et al, entitled "Exhaust Nozzle Flap Seal Arrangement" assigned to the same assignee as the present invention. Nozzles also require cooling for structural reasons. Cooling air is conventionally drawn from the fan section or a compressor section of the gas turbine engine which is expensive in terms of fuel and power consumption. Ejecting nozzles such as the type used on some General Electric J79 engine models have employed slot type ejectors to induct ambient cooling air from the atmosphere to supplement the engine supplied cooling air in order to reduce the use of the more expensive engine air. Such engines provided ejector cooling for variable nozzle throats but not for thrust vectoring nozzles such as axisymmetric vectoring exhaust nozzles which have 2 DOF pivoting flaps and seals.

The present invention overcomes these problems by providing a shielding means and a nozzle cooling means for vectoring nozzles and in particular axisymmetric vectoring nozzles to efficiently cool the nozzle and shield it from emitting infrared radiation. These features and advantages will become more readily apparent in the following description when taken in conjunction with the appended drawings.

SUMMARY OF THE INVENTION

Briefly, in accordance with one aspect of the present invention, an axisymmetric vectoring nozzle, having 2 DOF pivotal divergent flaps and interflap twistable seals mounted to and in between adjacent divergent flaps in sliding overlapping relationship, is provided with a thermal shield comprising outer flaps and seals wherein the outer seals are pivotally attached to respective divergent seals. Outer flaps are trapped between the control arms, in the form of Y-frames pivotally attached to the vectoring ring of the nozzle, used to pivot the divergent flaps and the overlapping axially extending edges of adjacent outer seals. The outer flap is pinned to the control arm to prevent circumferential or axial slippage thereby forming a pressure sealed annular nozzle bay between the outer flaps and seals and the divergent flaps and seals. Flexible sealing means between the forward ends of the outer flaps and seals and the vectoring ring and the aft ends of outer flaps and seals and the divergent flaps and seals provides continuous infrared radiation shielding through the entire range of motion of the universally pivotal divergent flaps and seals.

The pressure sealed bay provides a source of ambient cooling air for use by ejectors located on the divergent flap and seal. Divergent flap and seal plates, that also serve as liners include hot sides that face the hot nozzle exhaust flows, are split into forward and aft ends, preferably at a point about two thirds of the distance to the aft end, that are radially spaced apart from each other and have axially extending overlapping ends at the split point so as to form a slot for the ejector to flow film cooling air over the aft end of the hot side of the respective plates. The ejector draws ambient air from the pressure sealed nozzle bay that is open to the atmosphere.

Another embodiment provides supplemental liners radially inward of the plates to form cooling channels therebetween to further enhance the cooling of the nozzle.

In the drawings as hereinafter described, a preferred embodiment is depicted; however, various other modifications and alternate constructions can be made thereto without departing from the true spirit and scope of the invention.

DESCRIPTION OF THE PREFERRED EMBODIMENT

Figure 1:
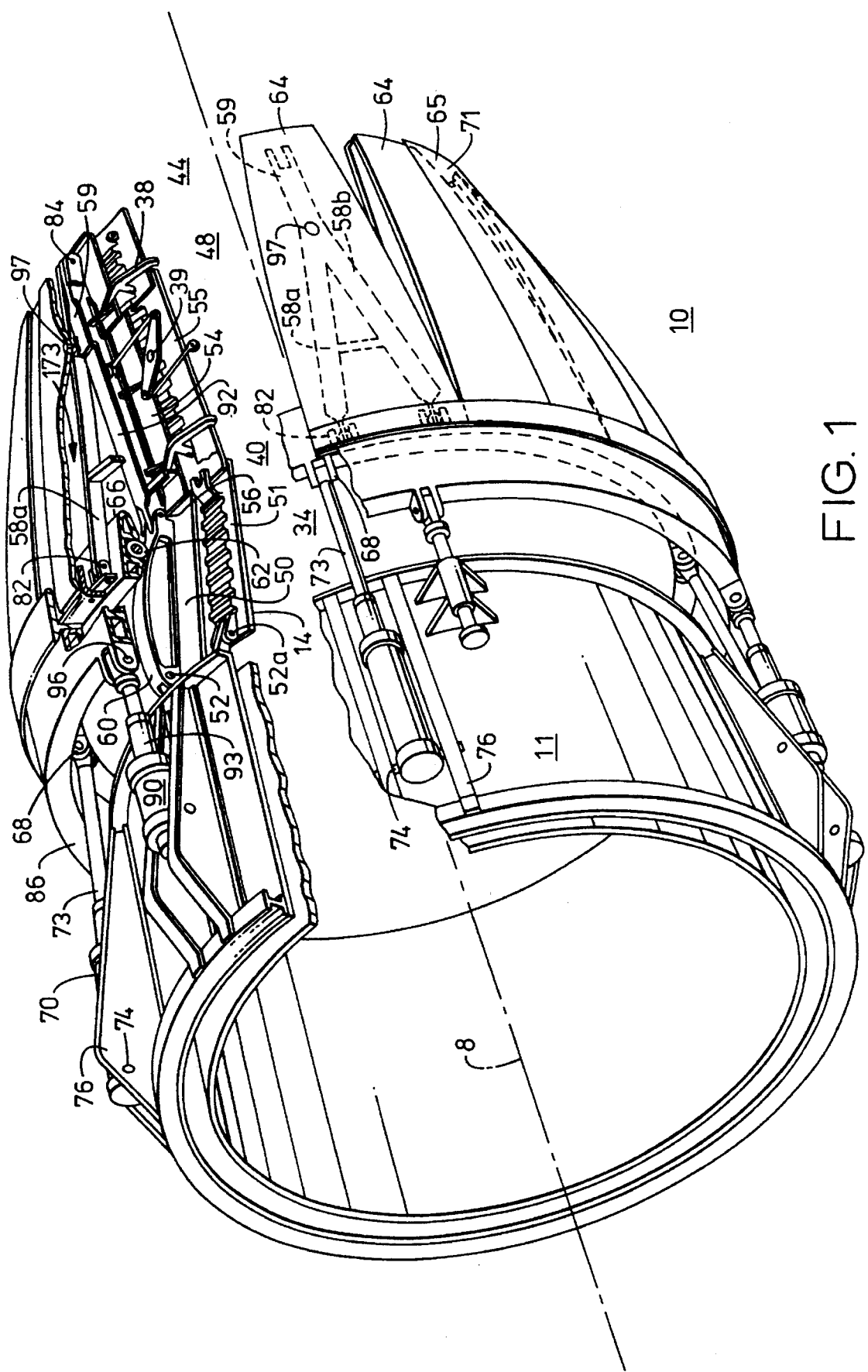
FIG. 1 is a partial cutaway perspective view of a gas turbine engine axisymmetric vectorable exhaust nozzle with outer flaps and seals and divergent flaps and seals in accordance with the present.

Referring to FIG. 1, the present invention is shown generally in the exhaust section 10 of a gas turbine engine comprising in serial flow relationship a fixed area duct 11, including an afterburner liner 12, and a variable area convergent/divergent axisymmetric vectoring exhaust nozzle 14 of the type disclosed in the Hauer patent. Nozzle 14, as shown, is of the convergent/divergent type including both a convergent section 34 and a divergent section 48 (as will be discussed hereinafter), the present invention is not intended to be limited to such a structure. Nozzle 14 comprises in serial flow relationship a convergent section 34, a throat 40 and a divergent section 48.

Figure 4:
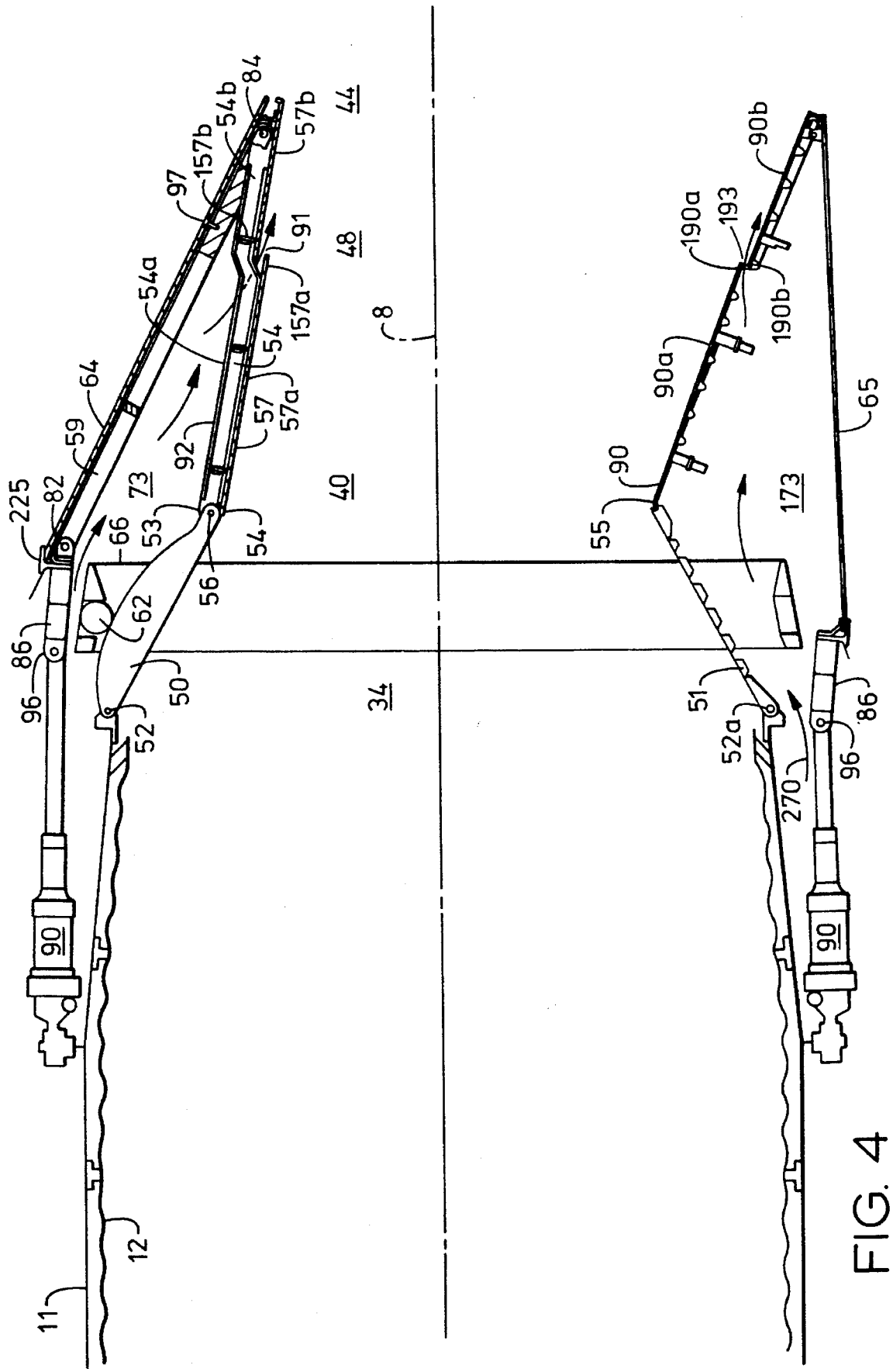
FIG. 4 is a cross-sectional view of an axisymmetric vectoring exhaust nozzle illustrated in FIG. 1 at an exemplary vectoring angle taken in planes as indicated by arrows marked 4 in FIG. 2.

Convergent section 34 includes a plurality of convergent flaps 50 circumferentially disposed about an engine centerline 8 and overlapping convergent seals 51 disposed between and in sealing engagement with radially inward facing surfaces of circumferentially adjacent convergent flaps 50 more particularly shown in FIG. 4. Convergent flaps 50 are pivotally attached at their forward ends to casing 11 by first pivotal or clevis joints 52 and convergent seals are similarly attached to casing 11 by slotted clevis joints 52a.

Divergent flaps 54 are pivotally attached to the aft end of convergent flaps 50 at divergent flap forward ends 53 by first universal or spherical joint means 56 generally at an axial position in the nozzle 14 which coincides with throat 40. Divergent flaps 54 are generally circumferentially disposed about engine center-line 8 with overlapping divergent seals 55 disposed between and in sealing engagement with the radially inward facing surface of circumferentially adjacent divergent flaps 54. Divergent seals 55 are supported in part by circumferentially adjacent divergent flaps 54 through a conventional track means 38 and connected to the divergent flaps by a conventional bell crank means 39. Details of divergent seal, its mounting, and the sealing function may be found in the Lippmeier reference above.

Throat 40 has associated with it a throat area conventionally denoted as A8 and the nozzle exit 44 is generally at the end of divergent flaps 54 and has an exit area associated with it conventionally denoted as A9. A plurality of rollers 62 are disposed in a convergent ring structure 66 which in turn is translated forward and aft by a plurality of convergent actuators 70, of which there are four in the preferred embodiment. The variable throat area A8 is controlled by the action of cam roller 62 on the cam surface 60 which is formed on the back of convergent flap 50.

During operation the high pressure of the exhaust gases within the nozzle force convergent flaps 50 and divergent flaps 54 radially outward thus keeping cam surface 60 in contact with cam roller 62. Convergent actuators 70, of which here are preferably 4, are pivotally connected to engine casing 11 by support 76 with a pin joint 74. Convergent actuator 70 has an actuator rod 73 which in turn is connected to convergent ring structure 66 by a spherical joint 68.

A plurality of vectoring actuators 90, of which there are three in the preferred embodiment, are mounted at different circumferential locations around case 11 than convergent actuators 70 in a manner similar to that of actuator 70. A vectoring ring 86 is connected to vectoring actuators 90 at the aft end of a vectoring actuator rod 93 by spherical joints 96. This allows vectoring ring 86 to be axially located and tilted about center-line 8 in order to control its attitude. Vectoring ring 86 controls the positioning or pivoting of divergent flaps 54. Divergent flaps 54 are pivotally connected to convergent flaps 50, preferably, by universal joints 56 and pivotally controlled in a 2 degree of freedom (2 DOF) manner by control arms 58a and 58b of a Y-frame 59 that operably connect vectoring ring 86 to divergent flaps 54. In an alternative embodiment, not particularly shown in detail in the FIGS., divergent flaps 54 may be pivotally connected to convergent flaps 50 by a spherical joints 56 and pivotally controlled in a 3 degree of freedom (3 DOF) manner by control arms 58a and 58b of Y-frame 59 that operably connect vectoring ring 86 to divergent flaps 54.

Control arms 58a and 58b are connected to vectoring ring 86 by 3DOF spherical joints 82 and to the aft end of secondary flap 54 by a spherical joint 84. Y-frame 59 is thereby clevis hinged at its forward end to vectoring ring 86 and at its aft end it is universally joined to the aft end of divergent flap 54. This linkage is operable to transform an attitude change of vectoring ring 86 into a multi degree of freedom pivoting change or orbital movement of divergent flap 54 whereby each divergent flap may be pivoted through a different angle thereby effecting vectoring of the nozzle's thrust.

The use of spherical joints 82 to attach control arms 58a and 58b provides clevis type pivoting of Y-frame 59 while preventing any twisting loads that may be imparted to either control arms 58a or 58b from being transferred back to vectoring ring 86. Backbone 92, sometimes referred to as being a part of divergent flap 54, is attached to and provides a mount for divergent flap 54 and support for the joints at either end. Axial translation, provided by simultaneous equal axial movement of actuator rods 93, of the vectoring ring opens and closes the nozzle exit 44 thereby providing control of nozzle exit area A9. A more detailed explanation of the thrust vectoring and control of nozzle throat area and exit area may be found in the Hauer patent referenced above.

A thermal shield 71 is circumferentially disposed around divergent section 48 forming a nozzle bay 173 therebetween. Thermal shield 71 is provided with a means for changing its shape or disposition about centerline 8 from axisymmetrical to asymmetrical. It has a generally frusto-conical shape converging in the axially aft direction.

Figure 2:
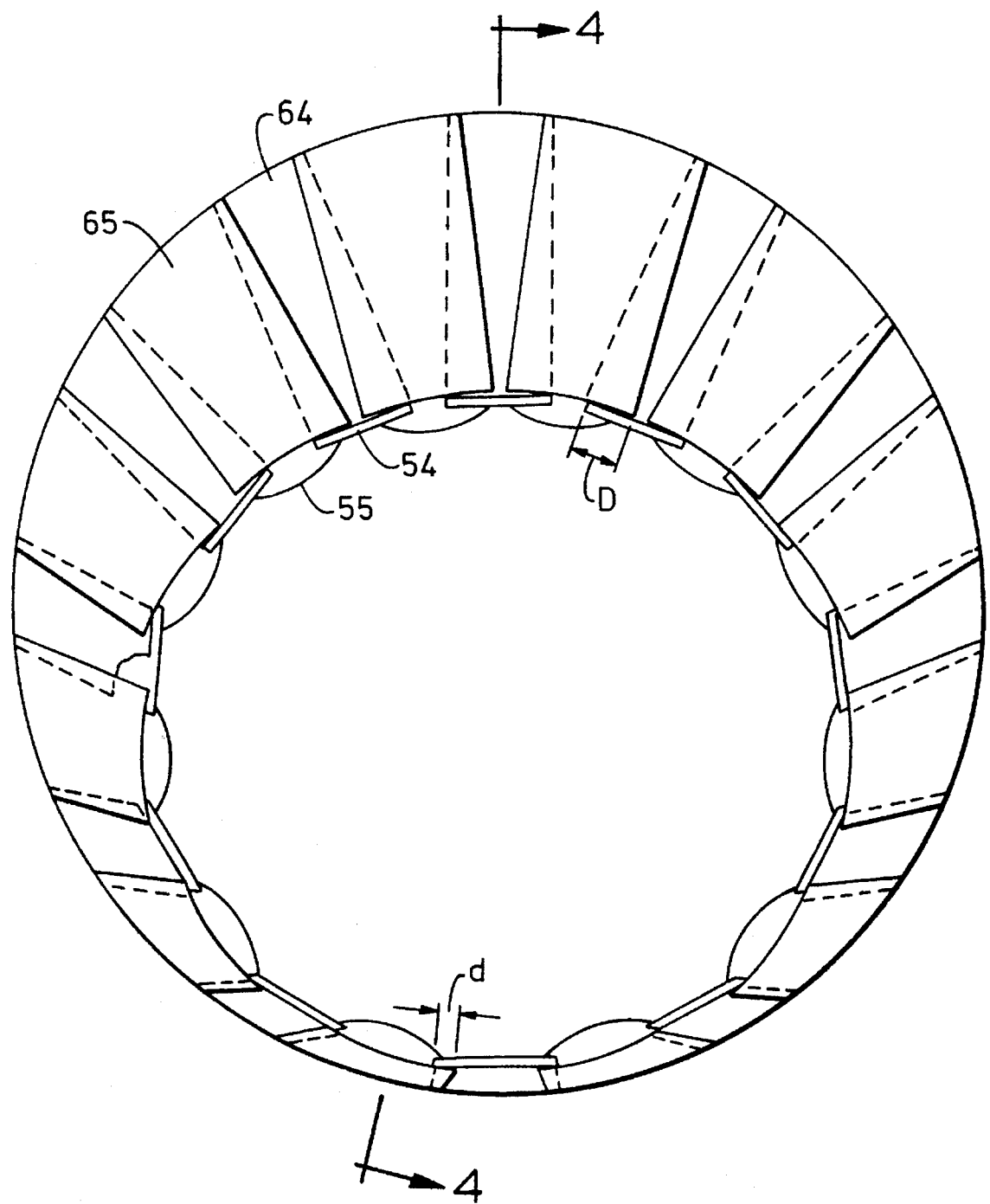
FIG. 2 is an aft looking forward diagrammatic view of the nozzle in FIG. 1 illustrating the overlapping nature of flaps and seals of the exhaust nozzle at an exemplary negative degrees of deflection or vectoring angle.

Referring to FIG. 2, thermal shield 71 includes outer seals 65 disposed radially outward of and in overlapping sealing engagement with respective outer flaps 64. Outer seals 65 trap outer flaps 64 against Y-frame 59 (not shown in FIG.2) to help retain the outer flaps during nozzle operation. The circumferential variation in the amount of overlap between adjacent flaps and seals can be seen by comparing circumferentially opposite overlaps d and D.

Figure 3:
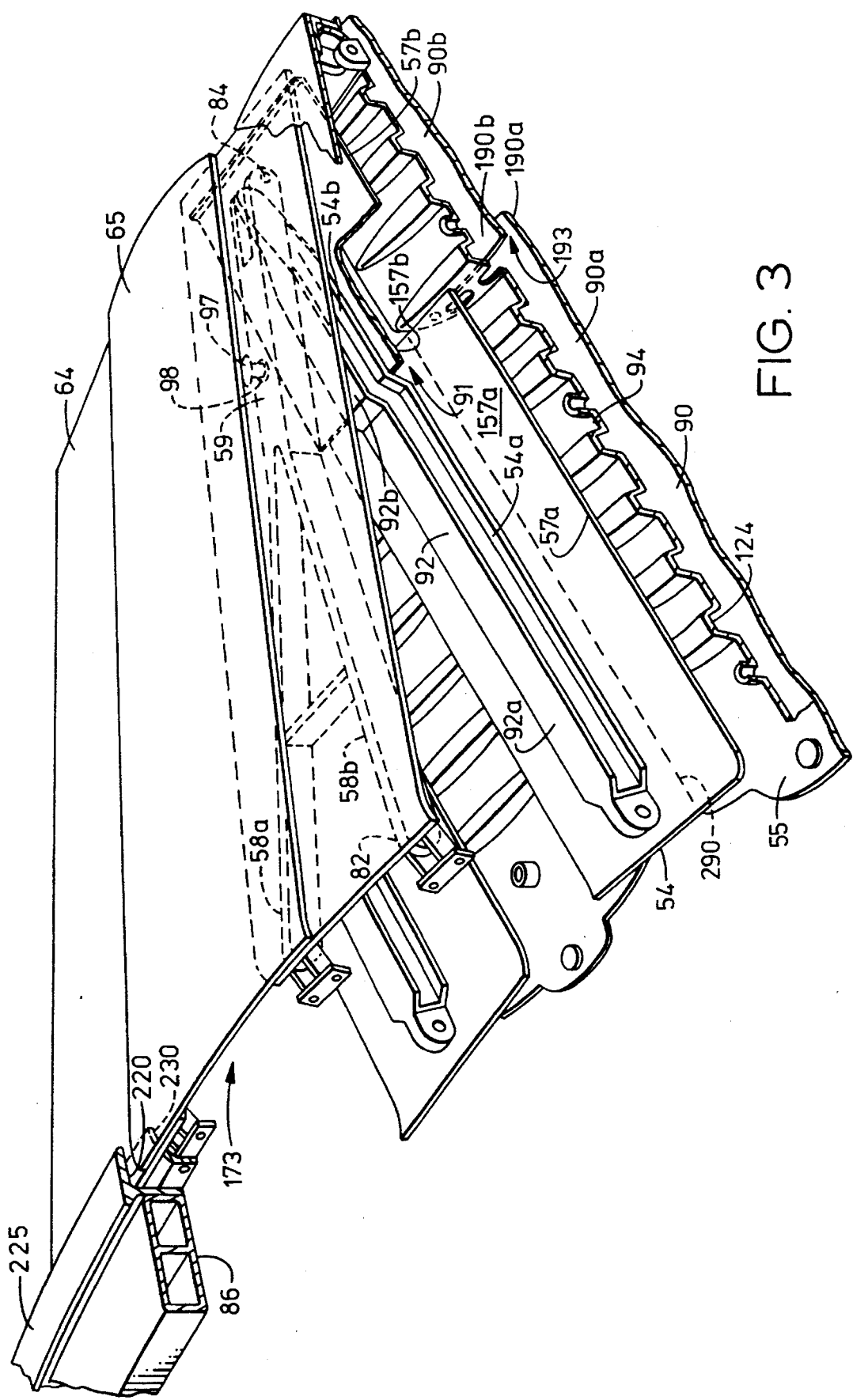
FIG. 3 is an exploded perspective view of a portion of the gas turbine engine axisymmetric vectorable exhaust nozzle in FIG. 1 illustrating the divergent flap and seal arrangement and outer flaps and seals in accordance with the preferred embodiment of the present invention.

FIG. 3 illustrates the outer flap and seal assembly of shield 71 in greater detail and means for changing its shape from axisymmetrical to asymmetrical. Axisymmetric vectoring nozzle 14 vectors by providing a means for its divergent flaps 54 and seals 55 to change from a generally axially aftwards diverging symmetrical frusto-conical segment to an asymmetrical one as depicted in FIG. 2. The present invention provides an outer shield 71 and a means for changing its shape from axisymmetrical to asymmetrical comprising outer flaps 64 and seals 65 around the asymmetric vectoring nozzle divergent section 48 so as to enclose it and block infrared radiation emissions. Vectoring is provided by pivoting Y-frame 59 which also provides the motion to change shield 71 from axisymmetric to asymmetric to conform to the asymmetric shape of nozzle 14 in its vectored mode.

Referring to FIGS. 3 and 4, which schematically illustrates the mounting of the flaps and seals, it can be seen that outer flap 64 is pinned to Y-frame 59 by a pin 97 fixed to outer flap 64 and disposed radially inward into a cylindrical cavity 98 in Y-frame 59. As explained herein outer flap 64 is trapped in a slidable manner against Y-frame 59 by overlapping outer seals 65. Outer flaps 64 and outer seals 65 are slidably received in a spring loaded slot 220 formed by an annular flange 225 attached to the aft end of vectoring ring 86 and an annular flange like spring 230 attached to flange 225. This permits outer flap 64 to twist and slide along the variable asymmetric frusto-conical surface formed by the outer flaps and seals during the vectoring process but remain essentially axially and circumferentially fixed with respect to Y-frame 59.

Referring to FIGS. 3 and 4, divergent flap 54 is split into a forward flap portion 54a and an aft flap portion 54b about two thirds of the way aft along divergent flap 54. Forward and aft flap plates 57a and 57b are mounted to a split level backbone 92 having a forward backbone section 92a and a radially outwardly spaced aft section 92b in a manner so as to provide forward and aft overlapping ends 157a and 157b of forward and aft flap plates 57a and 57b respectively. Radially spaced apart forward and aft overlapping ends 157a and 157b provide flap ejector slots 91 therebetween on either side of backbone 92.

Similarly, divergent seal 55 includes a seal plate 90 that is spilt into a forward seal plate portion 90a and an aft seal plate portion 90b about two thirds of the way aft along the seal plate with forward and aft overlapping ends 190a and 190b respectively forming a seal ejector slot 193. Forward seal plate portions 90a and aft seal plate portions 90b are mounted to a split level convexly ribbed mounting member 94 having convex ribs 124.

Forward seal plate portions 90a and an aft seal plate portions 90b include curved radially inner edges 290 that generally conform to the convex shape of the forward and aft seal plate portions and are designed to enhance sealing with corresponding circumferentially adjacent flap plate sections. A more detailed description of the seals may be found in the Lippmeier patent referenced above.

Forward seal plate portions 90a and an aft seal plate portions 90b are placed radially inward of and in sealing engagement with circumferentially adjacent forward and aft overlapping ends 157a and 157b thereby forming a series of circumferentially continuous and variable circumference ejector slot means comprised of flap ejector slots 91 and seal ejector slots 193.

Figure 6:
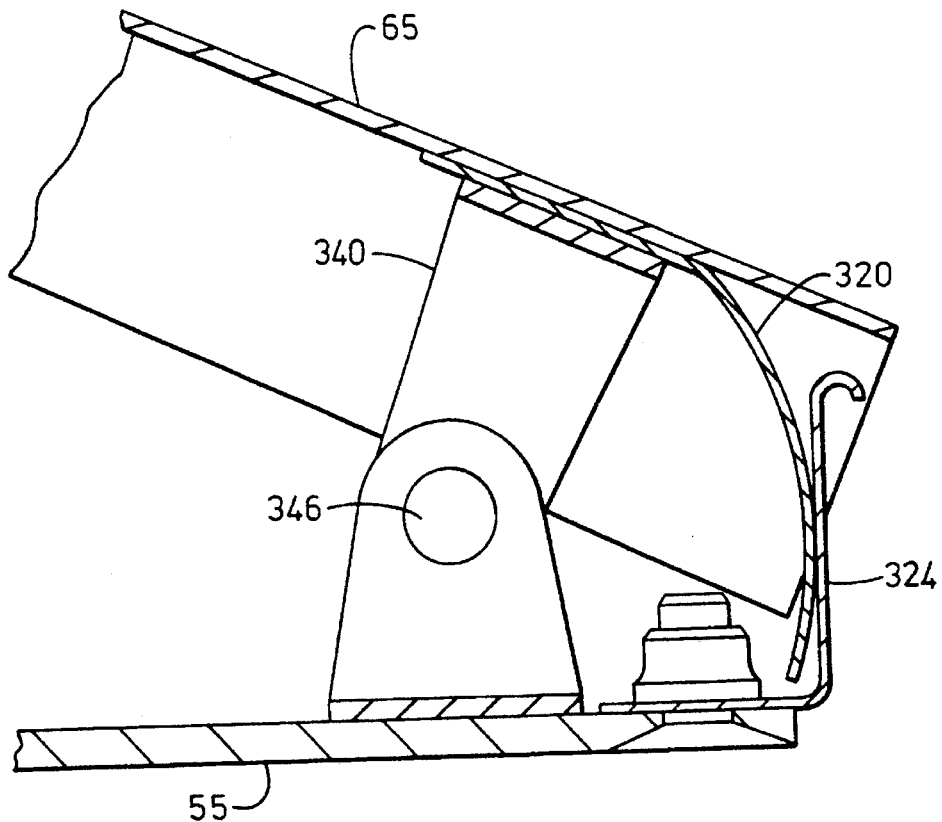
FIG. 6 is a cross-sectional view of the outer seal aft end sealing means of axisymmetric vectorable exhaust nozzle in FIG. 1.
Figure 5:
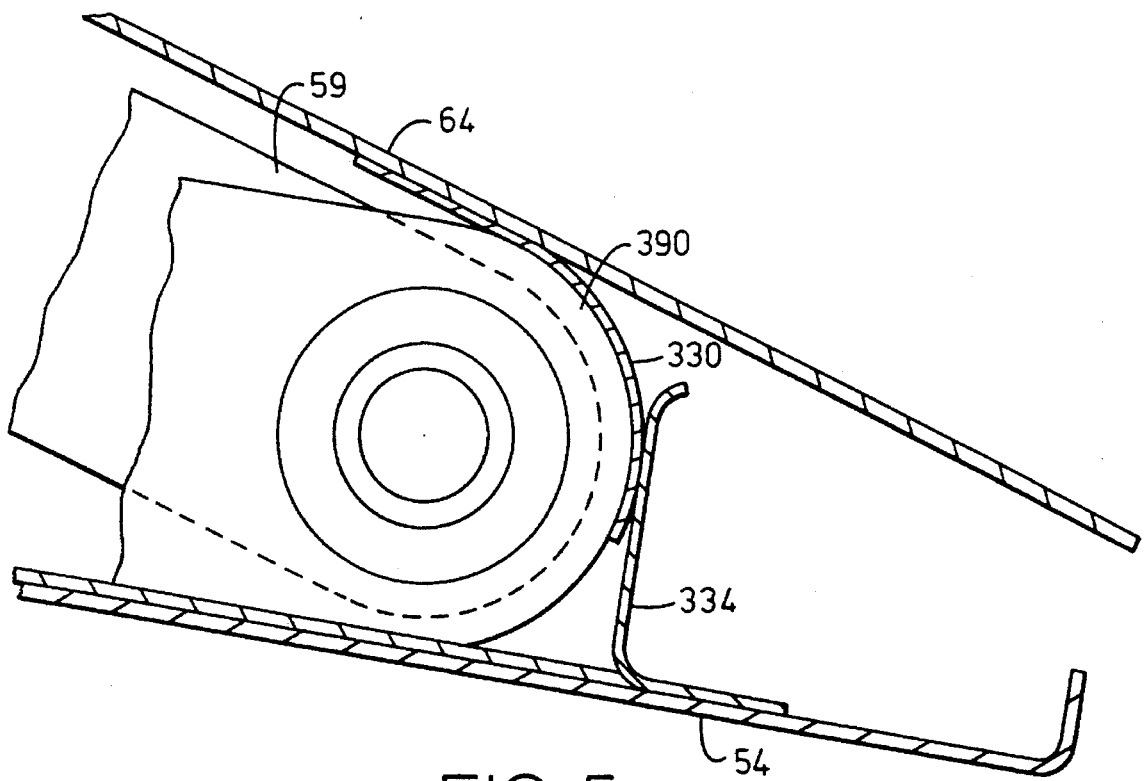
FIG. 5 is a cross-sectional view of the outer flap aft end sealing means for the axisymmetric vectorable exhaust nozzle of FIG. 1.

Nozzle bay 173 is pressurized by essentially ambient air flow 270. Nozzle bay aft sealing is provided by aft pivotal sealing means between outer and inner flaps and seals. Nozzle flap pivotal sealing means is shown in FIG. 5 comprising a first curved spring seal 330 mounted to outer flap 64 and conforming to a curved aft end 390 of Y-frame 59 and in slidable sealing engagement with a first fixed aft seal 334 mounted to the aft end of divergent flap 54. Nozzle seal pivotal sealing means is shown in FIG. 6 comprising a second curved spring seal 320 mounted to the aft end of outer seal 65 and in sliding sealing engagement with a second fixed aft seal 324 mounted to the aft end of divergent seal 55. Outer seal 65 is pivotally connected to divergent seal 55 by a 2 or 3 DOF pivoting means 340 having a respective universal or spherical type joint 346.

Having thus described what is considered novel and desired to be secured by Letters Patent of the United States is We claim:

1. An outer flap and seal assembly for an axisymmetric convergent/divergent nozzle, said outer flap and seal assembly comprising:

a plurality of overlapping outer flaps and outer seals having a general disposition about a longitudinal axis and a means for changing said outer flap and seal disposition from axisymmetrical to asymmetrical.

2. An outer flap and seal assembly as claimed in claim 1 wherein said outer flaps and seals define a generally variable conical surface and said means for changing said outer flap and seal disposition from axisymmetrical to asymmetrical comprises a means to pivot said outer flaps about a point on and flush to said generally conical surface.

3. An outer flap and seal assembly as claimed in claim 1 wherein said outer flaps and seals define a generally aftward converging variable conical surface and said means for changing said outer flap and seal disposition from axisymmetrical to asymmetrical comprises a means to pivot said outer seals about a point on and flush to said generally conical surface.

4. An outer flap and seal assembly as claimed in claim 2 wherein said means for changing said outer flap and seal disposition from axisymmetrical to asymmetrical further comprises a means to pivot said outer seals about a point on and flush to said generally conical surface.

5. An outer flap and seal assembly as claimed in claim 4 wherein said means to pivot said outer seals comprises:

a pin means to pivotally pin said outer flap to a nozzle control arm that pivots a divergent flap and said outer seals are radially outside of and overlapping said outer flaps.

6. An outer flap and seal assembly as claimed in claim 1, wherein said axisymmetric convergent/divergent nozzle includes a vectoring ring, and said outer flap and seal assembly further comprises a slot in said vectoring ring and each of said outer flaps and outer seals include a forward end slidably received in said slot.

7. An outer flap and seal assembly as claimed in claim 1, wherein said axisymmetric convergent/divergent nozzle includes divergent flaps and divergent seals, said outer flap and seal assembly further comprising said outer seals each having an aft end pivotally connected to a said divergent seal by pivoting means.

8. An outer flap and seal assembly as claimed in claim 6 further comprising a pin means to pivotally pin said outer flap to a nozzle control arm that pivots a divergent flap and said outer seals are radially outside of and overlapping said outer flaps.

9. An outer flap and seal assembly as claimed in claim 8 further comprising said outer seals each having an aft end pivotally connected to a corresponding divergent seal by pivoting means including a universal joint.

10. A flap cooling means for cooling an axisymmetric thrust vectoring nozzle, said flap cooling means comprising:

a plurality of circumferentially disposed universally pivotal divergent flaps including radially spaced apart and axially overlapping forward and aft flap plates wherein said aft flap plates are disposed radially outward of said forward flap plates providing ejector flap slots therebetween.

11. A flap cooling means as claimed in claim 10 further comprising:

a plurality of circumferentially disposed universally pivotal divergent interflap seals including radially spaced apart and axially overlapping forward and aft seal plates, said aft seal plates are disposed radially outward of said forward seal plates providing ejector seal slots therebetween, and said respective circumferentially adjacent forward and aft flap plates and seal plates are in overlapping slidably sealing engagement.

12. A flap cooling means as claimed in claim 11 wherein said flap plates are radially outward of respective adjacent ones of said seal plates.

13. A nozzle thermal shield for thermally shielding and cooling an axisymmetric thrust vectoring nozzle, said nozzle thermal shield comprising:

a plurality of universally pivotal divergent flaps circumferentially disposed about a longitudinal axis and including radially spaced apart and axially overlapping forward and aft flap plates wherein said aft flap plates are disposed radially outward of said forward flap plates so as to provide flap slots therebetween, a plurality of circumferentially disposed universally pivotal divergent interflap seals including radially spaced apart and axially overlapping forward and aft seal plates, said aft seal plates disposed radially outward of said forward seal plates providing seal slots therebetween, said respective circumferentially adjacent forward and aft flap plates and seal plates are disposed in overlapping slidably sealing engagement wherein said flap plates are radially outward of respective adjacent ones of said seal plates, and an outer flap and seal assembly disposed radially outward of said divergent flaps and seals comprising a plurality of overlapping outer flaps and outer seals having a general disposition about a longitudinal axis and a means for changing said outer flap and seal disposition from axisymmetrical to asymmetrical.

14. A nozzle thermal shield as claimed in claim 13 wherein said outer flaps and seals define a generally variable conical surface and said means for changing said outer flap and seal disposition from axisymmetrical to asymmetrical comprises a means to pivot said outer flaps about a point on and flush to said generally conical surface.

15. A nozzle thermal shield as claimed in claim 13 wherein said outer flaps and seals define a generally aftward converging variable conical surface and said means for changing said outer flap and seal disposition from axisymmetrical to asymmetrical comprises a means to pivot said outer flaps about a point on and flush to said generally conical surface.

16. A nozzle thermal shield as claimed in claim 15 wherein said means for changing said outer flap and seal disposition from axisymmetrical to asymmetrical further comprises a means to pivot said outer seals about a point on and flush to said generally conical surface.

17. A nozzle thermal shield as claimed in claim 16 wherein said means to pivot said outer seals comprises:

a pin means to pivotally pin said outer flap to a nozzle control arm that pivots a said divergent flap and said outer seals are radially outside of and overlapping said outer flaps.

18. A nozzle thermal shield as claimed in claim 13, further comprising:

said aft flap plates each including an aft end;

said outer flaps each including an aft end; and sealing means for substantially sealingly engaging said aft ends of corresponding aft flap plates and outer flaps.

19. A nozzle thermal shield as claimed in claim 13, further comprising:

said interflap seals aft seal plates each including an aft end;

said outer seals each including an aft end; and sealing means for substantially sealingly engaging said aft ends of corresponding outer seals and aft seal plates.

20. A nozzle thermal shield as claimed in claim 13, further comprising sealing means for substantially sealing aft ends of said aft flap plates, outer flaps, aft seal plates, and outer seals.

* * * * *